Sept. 12, 1939.   H. GROUT ET AL   2,172,998
GUM MASSAGER
Filed Feb. 19, 1938
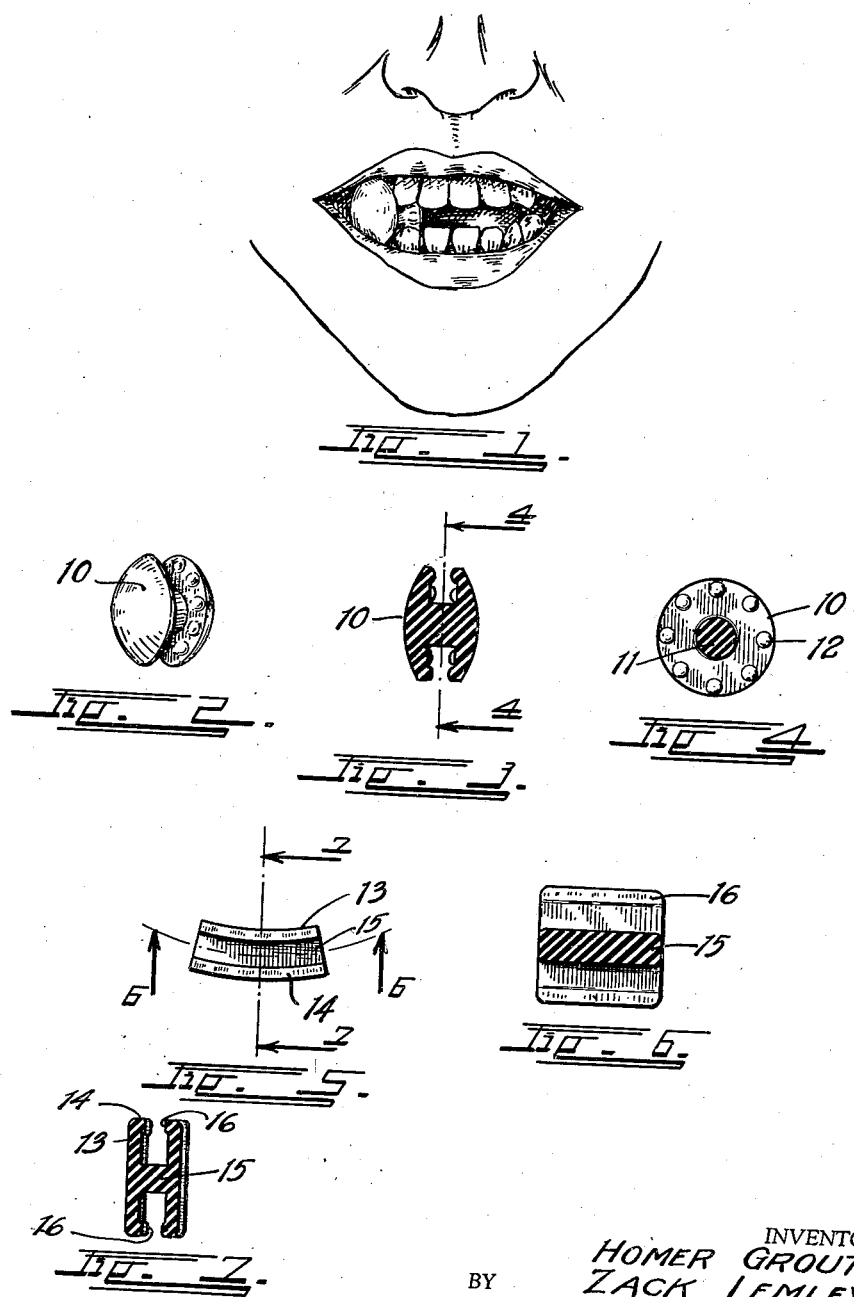
INVENTORS.
HOMER GROUT.
ZACK LEMLEY.
BY
ATTORNEY.

Patented Sept. 12, 1939

2,172,998

UNITED STATES PATENT OFFICE 2,172,998

GUM MASSAGER

Homer Grout and Zack Lemley, Denver, Colo.; said Lemley assignor to said Grout

Application February 19, 1938, Serial No. 191,500

2 Claims. (Cl. 128—62)

This invention relates to a device for massaging the gums, and has for its principal object the provision of a simple and efficient device which can be placed between the teeth and chewed upon and which will act to simultaneously massage and exercise the upper and lower gums and tooth tissues.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the device in use.

Fig. 2 is a perspective view thereof.

Fig. 3 is a cross section.

Fig. 4 is a cross section taken on the line 4—4, Fig. 3.

Fig. 5 is a plan view of an alternate form of the invention.

Fig. 6 is a longitudinal section taken on the line 6—6, Fig. 5.

Fig. 7 is a cross section of the alternate form taken on the line 7—7, Fig. 5.

The invention consists of a spool-like device formed of soft rubber or similar resilient material. The preferred form consists of two button-like rubber disks 10, joined together at their middle by means of a cylindrical stem portion 11. The peripherial edges of the disk 10 are formed with a series of knobs or projections 12 as illustrated. It is preferred to form the disk slightly concave on their inner faces as shown in Fig. 3.

In use, the device is placed between the teeth and the user bites upon the stem portion 11. This acts to draw the disks together, causing the edges thereof to engage the gums to massage and exercise them. The device can be rolled from tooth to tooth by the chewing motion of the jaws to efficiently massage the gums around the entire mouth without removing it from place.

The alternate form of the invention consists of two flat curved side faces 13 and 14, joined by a flat partition portion, 15. The interior edges of the side portions are preferably formed with projecting beads, 16. This form is used similarly to the first described form. In that it is placed between the teeth and the user bites upon the partition portion 15. The alternate form, however, covers a larger area of gum tissue, than the first form, and is curved to conform to the natural arch of the teeth.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A gum massaging device consisting of a pair of circular button-like members; and a cylindrical connecting stem connecting the centers of said members and holding them in spaced relation, the interior faces of the button-like members being formed with an annular series of projections for engaging the gums of a user, said device being integrally formed of resilient material.

2. A gum massaging device comprising: a pair of circular members, the outer faces of said members being convex, the inner faces thereof being flat; an annular series of protuberances on the flat face of each member; a relatively short cylindrical stem joining the centers of said two members and holding the flat faces parallel, the entire device being molded integrally of flexible rubber, the circular shape of said stem and members allowing the device to be rolled between the upper and lower sets of teeth by a shifting movement of the lower jaw.

HOMER GROUT.
ZACK LEMLEY.